US012212928B2

(12) United States Patent
Dressler et al.

(10) Patent No.: US 12,212,928 B2
(45) Date of Patent: Jan. 28, 2025

(54) METHOD FOR ELIMINATING ACOUSTIC REVERBERATION IN AN AUDIO SIGNAL, AND HEARING INSTRUMENT

(71) Applicant: Sivantos Pte. Ltd., Singapore (SG)

(72) Inventors: Oliver Dressler, Erlangen (DE); Tobias Daniel Rosenkranz, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 148 days.

(21) Appl. No.: 18/173,956

(22) Filed: Feb. 24, 2023

(65) Prior Publication Data

US 2023/0269546 A1 Aug. 24, 2023

(30) Foreign Application Priority Data

Feb. 24, 2022 (DE) .................... 10 2022 201 943.1

(51) Int. Cl.
*H04R 25/00* (2006.01)
*G10L 21/0208* (2013.01)
*G10L 21/0232* (2013.01)

(52) U.S. Cl.
CPC ........ *H04R 25/505* (2013.01); *G10L 21/0232* (2013.01); *G10L 2021/02082* (2013.01); *H04R 2225/43* (2013.01)

(58) Field of Classification Search
CPC .... H04R 25/505; H04R 2225/43; H04R 3/00; H04R 2430/00; G10L 21/0232; G10L 2021/02082; G10L 21/0208; H04S 7/305
USPC .......................................................... 381/314
See application file for complete search history.

(56) References Cited

U.S. PATENT DOCUMENTS

| | | | | |
|---|---|---|---|---|
| 10,757,514 | B2 | 8/2020 | Rosenkranz et al. | |
| 2006/0072766 | A1* | 4/2006 | Klein | H04M 9/082 379/406.01 |
| 2019/0394579 | A1* | 12/2019 | Rosenkranz | G10L 21/0208 |

FOREIGN PATENT DOCUMENTS

| | | | |
|---|---|---|---|
| DE | 102018210143 | A1 | 12/2019 |
| EP | 3588498 | A1 | 1/2020 |

OTHER PUBLICATIONS

Voigtman, Edward: “Low-Pass Filters for Signal Averaging”, Review of Scientific Instruments, vol. 57, No. 5, dated May 1, 1986, pp. 957-966, found in the Internet, URL:https://pubs.aip.org/aip/rsi/article-pdf/57/5/957/8376302/957_1_online.pdf>.

* cited by examiner

*Primary Examiner* — Yosef K Laekemariam
(74) *Attorney, Agent, or Firm* — Laurence A. Greenberg; Werner H. Stemer; Ralph E. Locher

(57) ABSTRACT

A method for eliminating acoustic reverberation in an audio signal. First and second level measurements are performed on the audio signal. The first level measurement uses a first attack parameter and a first decay parameter to measure a first attack time and a first decay time. The second level measurement uses a second attack parameter and a second decay parameter to form a second attack time that is identical to the first attack time and a second decay time that is longer than the first decay time. A difference between the first and second level measurements is calculated. The difference and the second level measurement are used to estimate a reverberation interference level, and the first level measurement and the reverberation interference level are used to ascertain a gain parameter for the audio signal.

17 Claims, 2 Drawing Sheets

METHOD FOR ELIMINATING ACOUSTIC REVERBERATION IN AN AUDIO SIGNAL, AND HEARING INSTRUMENT

CROSS-REFERENCE TO RELATED APPLICATION

This application claims the priority, under 35 U.S.C. § 119, of German Patent Application DE 10 2022 201 943.1, filed Feb. 24, 2022; the prior application is herewith incorporated by reference in its entirety.

FIELD AND BACKGROUND OF THE INVENTION

The invention relates to a method for eliminating acoustic reverberation in an audio signal, wherein a first level measurement for the audio signal is performed and a second level measurement for the audio signal is performed during the first level measurement. The first level measurement has a first attack time and a first decay time, the second level measurement has a second attack time that is identical to the first attack time and a second decay time that is longer than the first decay time, and a difference between the first level measurement and the second level measurement is calculated.

Acoustic reverberation usually arises in enclosed or at least partially enclosed spaces as a result of an occasioning sound event being reflected numerous times by the walls of a room and by other objects present in the room. Depending on the geometry of the room and the walls thereof and also depending on the type, number and geometry of the objects present in the room, the decay time for the reverberation in this scenario varies. The decay time is additionally influenced by the nature of the surfaces present in the room. In contrast to an echo, which is perceptible in isolation as a type of "repeat" of the occasioning sound event, the reverberation produces a substantially continuous "lingering" of the sound event.

While, in particular in music, a minimum amount of reverberation is even desirable for an agreeable sound sensation in order to prevent an excessively "dry" staccato-type tone, acoustic reverberation is often disadvantageous for the intelligibility of spoken contributions, since the characteristic sound events for distinguishing between in particular the individual consonants are of only very short duration, and accordingly overlaying them with the reverberation can distort the spectral information in this case, sometimes to a considerable degree. Depending on the decay time, this can even become a problem for distinguishing between the formants for recognizing vowels.

In hearing instruments in which audio signals are reproduced for a wearer, it is of particularly great importance that spoken contributions by interlocutors of the wearer are reproduced as intelligibly as possible for the wearer, since a lack of acoustic comprehension for a spoken contribution and the accompanying discernible loss of information for the wearer can be perceived as particularly obvious and therefore particularly disagreeable. This applies in particular to hearing devices "in the narrower sense", which are often used to compensate for hearing loss in the wearer in question. For this reason, techniques to improve the intelligibility of spoken contributions are often employed in hearing instruments, in particular in the aforementioned hearing devices.

Especially when dynamic compression is used, however, as is often the case, acoustic reverberation can adversely affect the all-important speech intelligibility to a particular degree: dynamic compression is intended to help in particular to amplify quiet sound events that are barely or no longer perceptible to the wearer (whether as a result of hearing loss in the wearer or as a result of the basically low sound level of the sound event) until they are sufficiently perceptible, without the same gain then also being applied to sufficiently loud sound events that can be perceived by the wearer without major problems, and therefore without further amplification possibly leading to a disagreeable volume.

This dynamic compression also "compresses" the acoustic reverberation, however, which means that the latter experiences correspondingly higher gain than the sound event producing it. As a result, firstly the decay time in the present surroundings is perceived by the wearer to be longer, and secondly the relationships described above mean that the intelligibility of spoken contributions is impaired.

German published patent application DE 10 2018 210 143 A1 and its counterpart U.S. Pat. No. 10,757,514 B2 disclose the practice of eliminating reverberation in an audio signal by performing two level measurements for the reverberation with different time constants, and by attenuating the audio signal on the basis of the difference in the level measurements.

SUMMARY OF THE INVENTION

It is an object of the present invention to improve the method for eliminating reverberation in an audio signal described above.

With the above and other objects in view there is provided, in accordance with the invention, a method for eliminating acoustic reverberation in an audio signal, the method comprising:

- receiving an audio signal;
- performing a first level measurement for the audio signal;
- performing a second level measurement for the audio signal during the first level measurement;
- performing the first level measurement by way of a first attack parameter and a first decay parameter to measure with the first level measurement a first attack time and a first decay time;
- performing the second level measurement by way of a second attack parameter and a second decay parameter to measure with the second level measurement a second attack time that is identical to the first attack time and a second decay time that longer than the first decay time;
- calculating a difference between the first level measurement and the second level measurement;
- using the difference and the second level measurement to estimate a reverberation interference level; and
- using the first level measurement and the reverberation interference level to ascertain a gain parameter for the audio signal for eliminating acoustic reverberation in the audio signal.

In other words, the afore-mentioned object is achieved according to the invention by a method for eliminating acoustic reverberation in an audio signal, wherein an audio signal is provided, wherein a first level measurement for the audio signal is performed, wherein a second level measurement for the audio signal is performed during the first level measurement, wherein the first level measurement is performed by means of a first attack parameter and a first decay parameter in such a way that the first level measurement has a first attack time and a first decay time, wherein the second level measurement is performed by means of a second attack parameter and a second decay parameter in such a way that the second level measurement has a second attack time that is identical to the first attack time and a second decay time that is longer than the first decay time, and wherein a difference between the first level measurement and the second level measurement is calculated.

There is provision in this case for the difference (between the first level measurement and the second level measurement) and the second level measurement to be used to estimate a reverberation interference level, and for the first level measurement and the reverberation interference level to be used to ascertain a gain parameter for the audio signal. Refinements that are advantageous and in some cases inventive in themselves are the subject matter of the dependent claims and the description that follows.

The elimination of acoustic reverberation in an audio signal in this context includes in particular elimination of those signal contributions in the audio signal that arise in the real acoustic situation, represented by the audio signal, as a result of acoustic reverberation. The audio signal in this case is provided in particular by means of one or more electroacoustic transducers that convert said real acoustic situation into one or more, in particular electrical, signals. To provide the audio signal, the (electrical) signal(s) thus generated can also be used to carry out preprocessing, which can include for example digitization, amplification, dynamic compression or noise reduction. Acoustic reverberation in this context includes in particular reflections of sound from an occasioning sound event by walls and/or objects, for instance in a partially or completely enclosed space, with repeated reflections of the propagating sound produced by the sound event resulting in continuous or almost continuous decay of the sound event at a fixed location.

A level measurement in the present context includes in particular the level measurement's forming a mathematical function, or the level measurement's being representable as such a function, by way of which an amplitude of the audio signal and/or an envelope of the amplitude and/or a square of the absolute value of the amplitude is mapped to an appropriate level value in a preferably strictly monotonous manner, and particularly preferably without an inflection point. This should in particular also not just take into account functions for which the relationship between their input variable and the mapped level value is of logarithmic type, but rather the concept of a level measurement here should also include more general functions having a suitable monotonic response.

A decay time for a level measurement in this context is intended to be understood to mean in particular the time that elapses after a signal contribution in the audio signal and a corresponding level swing in the level measurement until the level measurement has dropped to zero or to a predefined fraction of the level swing in the absence of further signal contributions in the audio signal. An attack time for a level measurement is intended to be understood to mean in particular the time that elapses after a spontaneously starting, steady-state signal contribution in the audio signal until the level measurement has reached a predefined proportion of the asymptotic limit value for the signal level that corresponds to the steady-state signal contribution. In this context, a shorter attack time means in particular a faster reaction by the level measurement to a spontaneously starting signal contribution in the audio signal.

The attack time and the decay time are adjusted for each of the two level measurements by means of the respective attack or decay parameter. If e.g. the level measurements are each implemented by way of an asymmetric, smoothing function of the amplitude (for example a recursive mean value function or the like), then the attack parameter can be provided by the weighting factor of the respective next amplitude contribution for the rising edge, and the decay parameter can accordingly be provided by the weighting factor of the respective next amplitude contribution for the falling edge.

A sound event includes in particular any sound-producing event in the real acoustic situation represented by the audio signal and/or converted by means of appropriate transducers in order to provide the audio signal, the sound-producing event being able to be assigned a clear end from the point of view of time. In this context, the elimination of the acoustic reverberation from the sound event in the audio signal means in particular elimination of those signal contributions in the real acoustic situation that correspond to the acoustic reverberation from the sound event.

The decay response of the two level measurements, characterized on the basis of the respective decay time, is dependent on the specific response of a room in which the audio signal provided is recorded. Immediately after the sound event, the first wavefront is initially incorporated directly and without further reflection in the audio signal, followed by first reflections by various boundaries and/or objects in the room, for which the delays in the propagation time are in particular dependent on the size of the room. These first reflections, which are still a type of attenuated and delayed version of the original sound event, are now firstly incorporated in the audio signal but secondly produce further, cascaded, reflections. As the order of the reflection and overlaying of the individual wavefronts increases, distinguishability of individual reflections is lost; after the early reflections, which can usually still be isolated, an (almost) continuous, diffuse reverberation tail then forms, which falls exponentially.

The difference in the two level measurements can be used, in particular if the two decay times are suitably chosen, to at least approximately and implicitly ascertain the contribution by the diffuse reverberation in the audio signal. This applies in particular if the second decay time is adjusted by means of the second decay parameter (which is preferably estimated for the present surroundings, or the present room) preferably in such a way that the decay response of the second level measurement is determined essentially by the contributions by the original sound event, which are gradually incorporated in the second level measurement to an ever lesser extent. The first decay time is adjusted by means of the first decay parameter preferably in such a way that the decay response of the first level measurement is determined essentially by the contributions by the diffuse reverberation at least after a short period of the early reflections, which contributions continue to "feed" the decaying first level measurement. In particular, the short period of the early reflections can also be identified on the basis of the difference in the two level measurements, like the diffuse reverberation that then follows, or descends therefrom.

If the contribution by the diffuse reverberation, or the decaying contribution by the sound event, in the second level measurement is known, for example as a result of a so-called minimum tracker being applied to the difference between the second and first level measurements (this difference is generally negative), and it is additionally ascertained when the minimum reached is left again (or is exceeded by a predefined minimum value), this knowledge can be used to take the second level measurement as a basis for estimating the reverberation interference level, which in particular can represent the proportion in the second level measurement that (essentially) involves, or is based on, the contributions by the diffuse reverberation (instead of the actual, decaying sound event).

The reverberation interference level can then be used to ascertain a gain parameter, as a result of which in particular a contribution by the sound event in the audio signal results in the elimination of acoustic and in particular diffuse reverberation from the sound event in the audio signal by virtue of attenuation of the audio signal on the basis of the gain parameter. The gain parameter can be ascertained as a gain factor, e.g. on the basis of the reverberation interference level as interference signal and the first level measurement as payload signal, which gain factor is applied to the audio signal.

The first level measurement and/or the second level measurement is expediently implemented by way of a weighted mean value function. This allows the different decay responses of the level measurements to be implemented particularly easily given an identical attack response, by applying weighting factors of the recursion, which are each different for the falling edge, to contributions in the audio signal that are newly added for the first or second level measurement. A weighting factor for a subsequent value of the weighted mean value function is preferably selected "asymmetrically" on the basis of a rising or falling level, i.e. for example a value of the audio signal at one instant is compared with the level value present at this instant on the basis of the weighted mean value function, and a weighting factor for the incorporation of the new value of the audio signal in the level measurement is selected on the basis of whether the value of the audio signal is greater or less than the present value of the level measurement.

The first level measurement or the second level measurement is advantageously implemented by way of a preferably first-order asymmetric recursive low-pass filter. For an audio signal a (n) in the discrete time domain, the respective level measurement pj (j=p1, p2) can then be represented as $$pj^2(n)=(1-c(n))\cdot a^2(n)+c(n)\cdot pj^2(n-1) \qquad \text{(i)}$$

with c (n)=$c_{rise}$ for $a^2$ (n)>$pj^2$ (n−1), $c_{fall}$ otherwise, where $pj^2$ (n) denotes the level value of the level measurement pj for the discrete time index n, and c (n) denotes a gradient parameter that is set to one of the two constants $c_{rise}$, $c_{fall}$ on the basis of the aforementioned condition for $a^2$ (n).

A physical decay time constant for present surroundings in which a sound level of a sound signal on which the audio signal is based (i.e. in particular a sound signal from which the audio signal is generated) has dropped to a predefined proportion of an initial value is expediently ascertained, wherein the second decay parameter is selected in such a way that the second decay time of the second level measurement is provided by said physical decay time constant for the present surroundings. The drop to the predefined proportion of an initial value that is used in this instance is preferably a drop by 60 dB, which is consistent with the time constant T60. A drop by 60 dB is generally consistent with complete decay down to the background noise.

The difference between the first level measurement and the second level measurement is advantageously compared with a stipulated first limit value, wherein if the absolute value of the difference between the two level measurements exceeds the absolute value of the first limit value, then the presence of a contribution by the diffuse reverberation, and/or of a decaying contribution by the sound event in the second level measurement, is detected. This includes in particular the formation of the difference and, if said difference is negative, the detection of the presence of diffuse reverberation if this difference is below the now likewise negative first limit value. As soon as the difference exceeds the first limit value again (or the absolute value of the difference falls short of the absolute value of the first limit value), no further diffuse reverberation is present in this implementation, which means that preferably no further attenuation takes place either. The attenuation of the audio signal is preferably controlled on the basis of a comparison of said difference with the first limit value.

If the absolute value of the difference between the two level measurements exceeds the absolute value of the first limit value, then the difference between the absolute value of the difference and the absolute value of the limit value is preferably ascertained as the decaying contribution by the sound event in the second level measurement. This includes in particular the circumstance that a negative difference in the level measurements results in the ascertainment of the value by which the difference falls short of the first limit value as the contribution by the diffuse reverberation that is incorporated in particular quantitatively in the reverberation interference level. In other words, the first limit value provides firstly a binary criterion for whether diffuse reverberation, or a decaying contribution by the sound event, is actually present and secondly a quantitative measure of said decaying contribution if it is present. In particular, a minimum tracker can be used for said difference, and the ascertained minimum can be compared, for instance, with the first limit value. The decaying contribution by the sound event comprises in particular those components in the second level measurement that are essentially or merely based on the actual sound event, and decrease, or disappear, only gradually as a result of the time delay due to the smoothing. It is in particular advantageous in this case if the second decay time for the second level measurement is chosen to be the decay time constant T60; during a phase of late, in particular diffuse, reverberation, the first level measurement, which initially has a faster first decay time (and therefore a faster decay response) for early reflections, therefore also decays at this decay rate in the room due to the sound power of the diffuse reverberation.

The decaying contribution by the sound event, and in particular also the absolute value of the first limit value, is preferably used to produce a time-dependent correction function, wherein the reverberation interference level is produced on the basis of a subtraction of the correction function from the second level measurement. The time-dependent correction function can be provided in particular by a base value that is dependent on the first limit value, and the contributions by the decaying sound event, which are ascertained as described above.

The gain parameter is advantageously ascertained on the basis of a spectral subtraction, for which in particular a quotient of the reverberation interference level and the first level measurement is used. The gain parameter can then be provided, for example, as $$G(n)=1-prn(n)/p1(n) \qquad \text{(ii)}$$

with prn (n)=p2 (*n*)−d (n) as the reverberation interference level, p1 and p2 as the first and second level measurements, and d (n) as the correction function on the basis of $$d(n)=\min[p1(n)-p2(n),th1] \qquad \text{(iii)}$$

with the (negative) first limit value th1.

In one advantageous refinement, the audio signal is broken down into a plurality of frequency bands, wherein the first level measurement and the second level measurement are each performed on a frequency band by frequency band basis, wherein the respective gain parameter for a plurality of frequency bands is ascertained, in particular by calculating the difference between the two level measurements on a frequency band by frequency band basis, said difference being used to ascertain the respective decaying contribution by the sound event in the frequency band and, from this, the respective reverberation interference level, and wherein the respective gain parameter is applied to the signal component of the audio signal in the frequency band in order to eliminate the acoustic reverberation. The gain parameter G (n) in equation (ii) can be replaced in this case by an appropriate plurality of gain parameters G (n, k) in the time-frequency domain, where k is the band index.

With the above and other objects in view there is also provided, in accordance with the invention, a method for eliminating acoustic reverberation in an audio signal of a hearing instrument, in particular a hearing device, wherein an input transducer of the hearing instrument is used to provide the audio signal from a sound signal from the surroundings, and wherein acoustic reverberation in the audio signal is eliminated by way of the method described above, and also a hearing instrument, which can be provided in particular as a hearing device, having an input transducer for generating an audio signal and a signal processing unit that is configured to perform the method described above.

The method in the hearing instrument and the hearing instrument itself share the benefits of the method for eliminating reverberation described above. The advantages indicated for the method for eliminating acoustic reverberation in an audio signal and for its developments can be transferred, mutatis mutandis, to the method in the hearing instrument and to the hearing instrument itself.

Other features which are considered as characteristic for the invention are set forth in the appended claims.

Although the invention is illustrated and described herein as being embodied in a method for eliminating acoustic reverberation in an audio signal, and a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

Mutually corresponding parts and variables are each provided with the same reference signs throughout the figures.

DETAILED DESCRIPTION OF THE INVENTION

Figure 1:
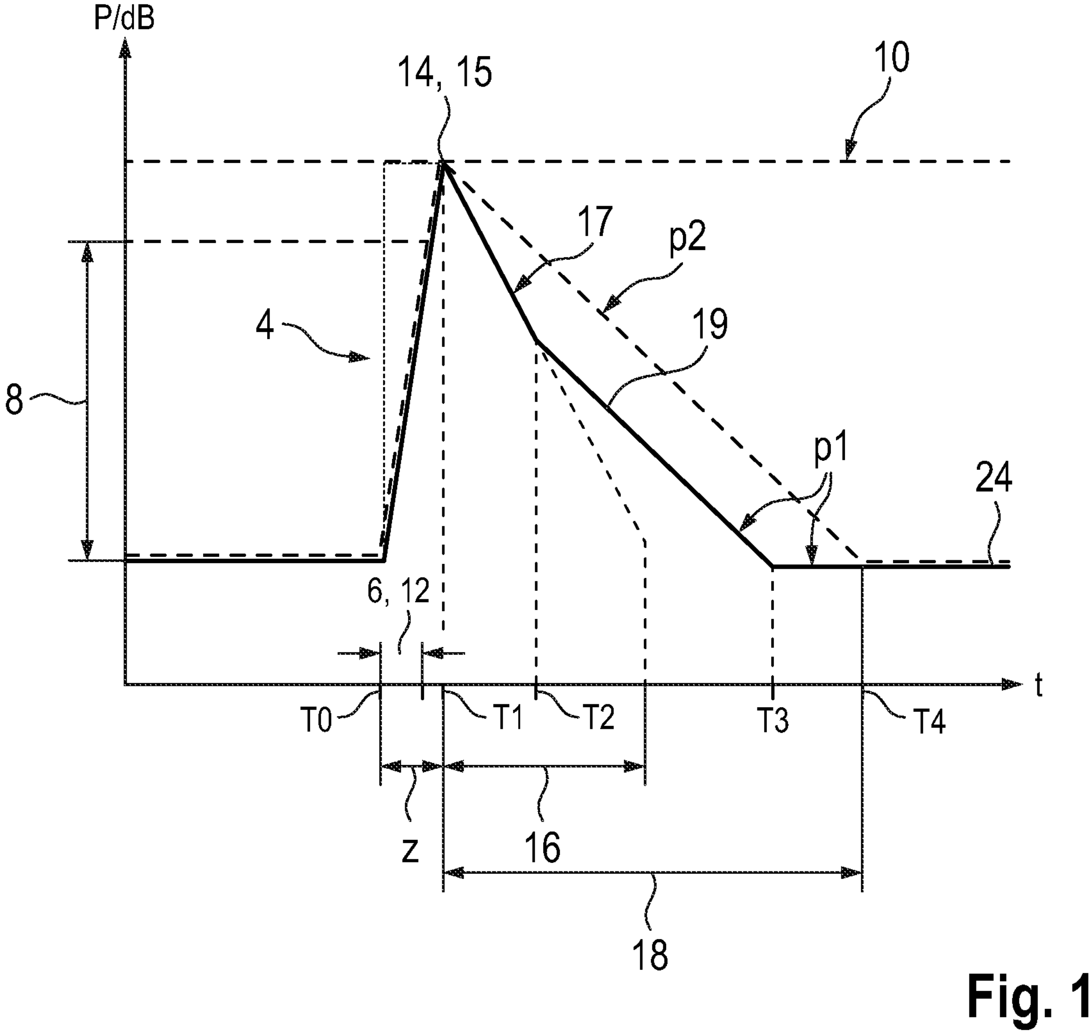
FIG. 1 is a timing diagram to schematically show a first level measurement and a second level measurement for the same audio signal with identical attack times and in each case different decay times.

Referring now to the figures of the drawing in detail and first, in particular, to FIG. 1 thereof, there is shown a timing diagram over a time t to schematically show the level values P from a first level measurement p1 (solid line) and a second level measurement p2 (dashed line). Each of the level measurements p1 and p2 is performed on an audio signal (not shown in more detail). At an instant T0 the audio signal contains an isolated sound event 4 (dotted line), which firstly has a clearly defined end and secondly gives rise to contributions by acoustic reverberation in the audio signal (not shown) due to the physical surroundings in which the audio signal was recorded to generate it. The sound event 4 in this case is meant to have only a very short length of time z. All of the sound energy of the sound event 4 is therefore concentrated in this length of time z. This can be the case for example for a bang, a thump, a slap, but also for consonants in speech, in particular for plosives, and for similar sounds of very short duration.

The first level measurement p1 has a first attack time 6, which passes by after the instant T0, at which the sound event 4 starts, until the first level measurement has assumed a predefined proportion 8 of the asymptotic level 10, the asymptotic level 10 corresponding to the level that the first level measurement would assume for a steady-state, continuous sound event with a signal level identical to the sound event 4. The second attack time 12 of the second level measurement p2 is identical to the first attack time 6 of the first level measurement in the present case.

For this reason, the first level measurement p1 and the second level measurement p2 have the same attack response, and therefore assume the same maximum value 14 for the level, which is just below the asymptotic level 10, at the instant T1, which marks the end of the length of time z and therefore the end of the sound event 4.

At the instant T1 the decay response characterized by the reverberation now starts in the real acoustic situation represented by the audio signal, as a result of which the decay responses of the first level measurement p1 and the second level measurement p2 now also merge according to the respective decay time.

The attack response and the decay response of the first and second level measurements p1, p2 are schematically shown linearly here, as a result of which a peak is also obtained at the transition from the attack response to the decay response in this representation. The attack response may already rise more slowly before that transition, however, and the transition can in particular also take place in a smooth manner.

The first level measurement p1 and the second level measurement p2 have a first decay time 16 and a second decay time 18, respectively, the second decay time 18 being longer than the first decay time 16. The second decay time can be expressed in relation to the decay time constant T60, according to which a sound level has decreased from a maximum value by 60 dB, and is often used as a measure of a decay in a room, as follows: the "decay rate" of the second level measurement is provided by the difference between the maximum value 14 and the initial value 24, divided by the second decay time 18; in the present case, this decay rate corresponds to a rate of 60 dB/T60. The first decay time 16 can be provided for example by half of the second decay time 18 (or a similar value), and determines in particular the beginning of the decay response 15 of the first level measurement p1 (see dotted line to extrapolate the first decay time 16).

The first and second level measurements p1, p2 are each implemented as a first-order asymmetric recursive low-pass filter, as a result of which an applicable decay parameter of the filter, which controls the perpetuation of existing level values for the next particular instant in the level measurement p1, p2 (cf. equation (i), see above), can be used to adjust the respective decay time 16, 18. For the second level measurement p2, the second decay time 18 thus adjusted is slow enough for the decay response to be provided by the linear regression of the filter. Although the acoustic contributions by the diffuse reverberation of the reverberation tail may contribute to the value of the second level measurement p2, they do not determine the decay response thereof.

For the first level measurement p1, on the other hand, the first decay time 16 is such that, after a first peak 15, which corresponds to the maximum value 14 and is provided by the sound event 4, and after a fall 17 at a speed corresponding to the first decay time 16 (in the event of which fall the first and early reflections may still contribute to the audio signal), there is a transition to a shallower edge 19 at an instant T2. In this edge, the gradually decreasing contributions by the diffuse reverberation actually "feed" the first level measurement p1, and therefore determine its decay response in this area.

Since the decay response in the shallower edge 19 of the first level measurement p1 is thus actually determined by the diffuse reverberation that decays with the decay time T60 in the room, this exponential decay response from the instant T2 in the logarithmic representation of the first level measurement p1 is parallel to the decay response of the second level measurement p2, until the first level measurement has dropped to the initial value 24 before the sound event 4 at an instant T3: the diffuse reverberation in the room in which the audio signal was generated has therefore died away. Due to the longer second decay time 18, the second level measurement p2 does not drop to the initial value 24 until at a later instant T4, on the other hand. The initial value 24 can be provided, for instance, by background noise in the audio signal.

Figure 2:
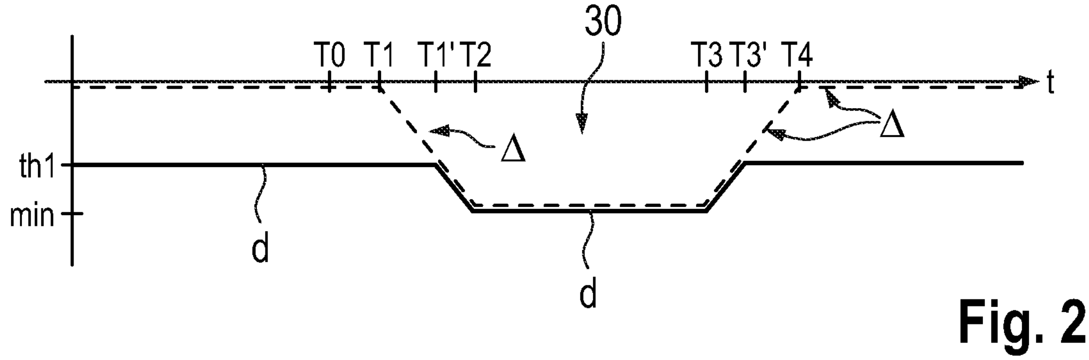
FIG. 2 is a timing diagram to schematically show a difference in the level measurements shown in FIG. 1, and a correction function ascertained therefrom.

FIG. 2 uses a timing diagram to schematically show a difference Δ between the first level measurement p1 and the second level measurement p2 shown in FIG. 1 (dashed line). Owing to the fact that p1 and p2 are both equal to the initial value 24 up to the instant T0, and have the same attack response up to the instant T1 owing to the identical first and second attack times 6, 12, the difference Δ=p1−p2 is equal to exactly 0 up to the instant T1. Owing to the different first and second decay times 16, 18 (see FIG. 1), the difference Δ drops to a minimum value min<0 up to the instant T2, and remains at said minimum value min between the instants T2 and T3 (see FIG. 1, parallel curve) owing to the identical decay response of the two level measurements p1, p2. Not until after the instant T3, from which the first level measurement p1 has already assumed the initial value 24, to which the second level measurement p2 still falls up to the instant T4 (see FIG. 1), does the absolute value of the difference Δ decrease again, i.e. the difference Δ rises back to the value zero up to the instant T4.

The difference Δ is now compared with a first limit value th1, the comparison being intended to be used to ascertain a contribution by diffuse reverberation in the second level measurement p2 in a manner that will be described. The absolute value of the first limit value is lower than the absolute value of the minimum value min, that is to say |th1|<|min|, or 0>th1>min.

The first limit value th1 should preferably be chosen such that the minimum value min of the difference Δ can be reliably identified by way of an appropriate comparison. It is therefore assumed that if Δ<th1 (that is to say if the difference Δ is below the first limit value th1), there is a contribution 30 by diffuse reverberation in the audio signal, since firstly the decay response of the first level measurement p1 for the period of time between the relevant instants T2 and T3 is provided directly by said diffuse reverberation, whereas the decay response of the second level measurement p2 is still largely provided by the original sound event 4 owing to the slow second decay time 18, the contribution 30 by the diffuse reverberation also being included in the second level measurement p2, however.

The difference Δ=p1−p2 and the first limit value are now used to form a correction function d (solid line) on the basis of equation (iii). This correction function d is formed by the first limit value th1 up to an instant T1'>T1 (with T1'<T2), and transitions into the difference Δ for t>T1'. At an instant T3'>T3 (with T3'<T4), the correction function d is provided by the first limit value th1 again.

Figure 3:
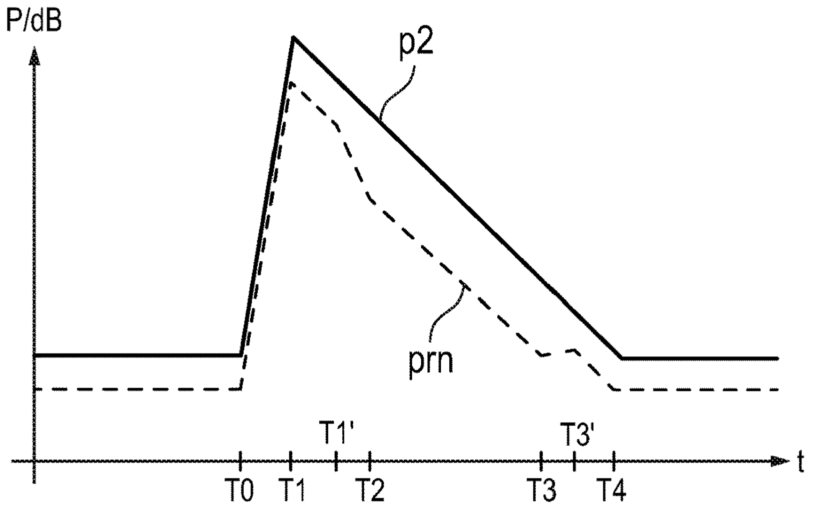
FIG. 3 is a timing diagram to schematically show the second level measurement and a reverberation interference level ascertained on the basis of the correction function shown in FIG. 2.

The benefit of this correction function d becomes clear from FIG. 3: FIG. 3 uses a timing diagram to schematically show the second level measurement p2 (solid line) as in FIG. 1. In addition, a reverberation interference level prn (dashed line) provided by the second level measurement p2, from which the correction signal d shown in FIG. 2 was subtracted, is shown. Since the first level measurement p1 is determined by the contributions by the diffuse reverberation for the period of time between the instants T2 and T3, and, although said contributions are likewise incorporated in the second level measurement p2 in this period of time, said second level measurement is determined primarily by the contribution by the sound event 4 that decays according to the second decay time 18 (that is to say the "isolated" decaying contribution, without newly added sound contributions), the correction function d is essentially provided by the decaying contribution by the sound event 4 in the second level measurement p2 between the instants T2 and T3 (or, based on the transitions, even between T1' and T3'). In other words, between the instants T2 and T3, the actual sound power is essentially equal to the first level measurement p1, and so the (negative) correction function d is added to the second level measurement p2 in order to likewise attain the actual sound power in the reverberation interference level prn in this interval. The second level measurement p2 is always above the actual sound power and therefore also above the power of the diffuse reverberation.

The reverberation interference level prn=p2+d is therefore essentially provided by the diffuse reverberation in said period of time. Before the instant T1' and after the instant T3', the reverberation interference level prn is provided by the constant offset owing to the first limit value th1 in the correction function d.

Figure 4:
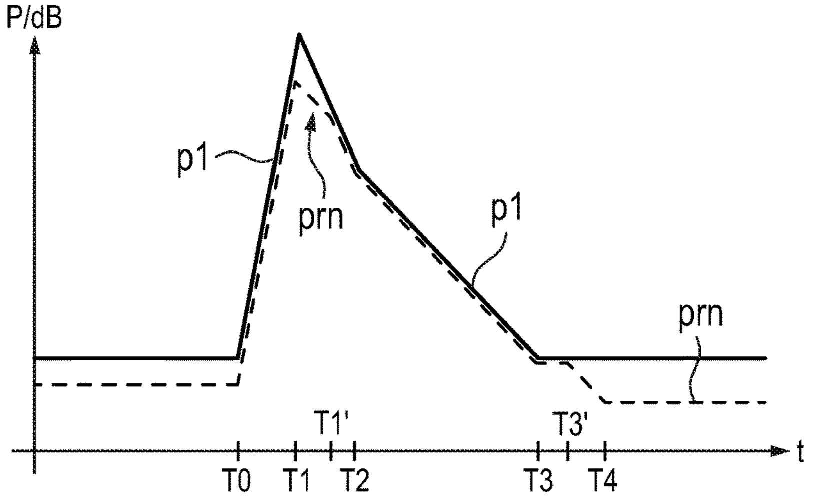
FIG. 4 is a timing diagram to schematically show the reverberation interference level shown in FIG. 3 and the first level measurement.

FIG. 4 uses a timing diagram to schematically show the reverberation interference level prn (dashed line) and the first level measurement p1 (solid line). In the period of time between the instants T2 and T3, in which the first level measurement p1 is determined by the diffuse reverberation, the two said lines are essentially one on top of the other. Even though a schematic, idealized representation is shown in the present case, the real case will be similar, namely the two lines will each provide almost identical values in the region of the diffuse reverberation.

If a gain factor is now determined in a frequency band on the basis of equation (ii), and is applied to the signal component of the audio signal 50 in the frequency band, the diffuse reverberation (between the instants T2 and T3) can be eliminated, while the other contributions by the audio signal 50 in the frequency band are preserved, since it then holds that p1>prn there.

The method illustrated on the basis of FIG. 1 for eliminating the acoustic reverberation in the audio signal can be performed in particular on a frequency band by frequency band basis in this case. To this end, the audio signal is split into respective individual frequency bands, in each of which the first and second level measurements p1, p2 are performed as shown. The attenuation of the audio signal can then be controlled for each frequency band individually on the basis of the respective gain parameter G ascertained in this frequency band according to the attack response and the decay response.

Figure 5:
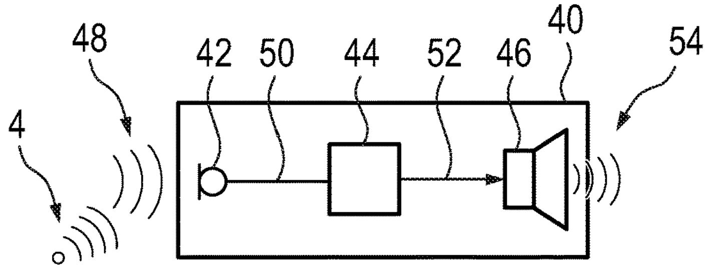
FIG. 5 is a block diagram schematically illustrating a hearing instrument.

FIG. 5 uses a block diagram to schematically show a hearing instrument 40 that comprises an input transducer 42, a signal processing unit 44 and an output transducer 46. The input transducer 42, which in the present case is provided by a microphone, generates the audio signal 50 from a sound signal 48 from the surroundings that also incorporates a specific sound event 4. Acoustic reverberation of the sound signal 4 in the audio signal 50 can now be eliminated in the signal processing unit 44 in the manner described on the basis of FIG. 1 or in the manner described on the basis of FIG. 2. The resultant signal is processed further, in particular subjected to dynamic compression and to frequency-band-dependent amplification, and an output signal 52 is generated therefrom, which is converted into an output sound signal 54 by the output transducer 46.

Although the invention has been illustrated and described more thoroughly in detail by way of the preferred exemplary embodiment, the invention is not limited by this exemplary embodiment. Other variations can be derived therefrom by a person skilled in the art without departing from the scope of protection of the invention.

The following is a summary list of reference numerals and the corresponding structure used in the above description of the invention:

4 sound event
6 first attack time
8 predefined proportion
10 asymptotic level
12 second attack time
14 maximum value
15 peak
16 first decay time
17 fall
18 second decay time
19 shallower edge
24 background noise
40 hearing device
42 input transducer
44 signal processing unit
46 output transducer
48 sound signal
50 audio signal
52 output signal
54 output sound signal
d correction function
min minimum value
P level values
p1 first level measurement
p2 second level measurement
prn reverberation interference level
t time
th1 first limit value
T0-T4 instant
T1', T3' instant
z length of time
Δ difference

The invention claimed is:

1. A method for eliminating acoustic reverberation in an audio signal, the method comprising:
- receiving an audio signal;
- performing a first level measurement for the audio signal;
- performing a second level measurement for the audio signal during the first level measurement;
- performing the first level measurement by way of a first attack parameter and a first decay parameter to measure with the first level measurement a first attack time and a first decay time;
- performing the second level measurement by way of a second attack parameter and a second decay parameter to measure with the second level measurement a second attack time that is identical to the first attack time and a second decay time that longer than the first decay time;
- calculating a difference between the first level measurement and the second level measurement;
- using the difference and the second level measurement to estimate a reverberation interference level; and
- using the first level measurement and the reverberation interference level to ascertain a gain parameter for the audio signal for eliminating acoustic reverberation in the audio signal.

2. The method according to claim 1, wherein a contribution by the sound event in the audio signal results in an elimination of acoustic reverberation from the sound event in the audio signal by virtue of an attenuation of the audio signal based on the gain parameter.

3. The method according to claim 2, which comprises applying the gain parameter to the audio signal in order to eliminate the acoustic reverberation from the sound event in the audio signal.

4. The method according to claim 1, which comprises implementing at least one of the first level measurement or the second level measurement by way of a weighted average function.

5. The method according to claim 4, which comprises selecting a weighting factor for a subsequent value of the weighted average function depending on a rising or falling level.

6. The method according to claim 1, which comprises implementing the first level measurement or the second level measurement by way of a first-order asymmetric recursive low-pass filter.

7. The method according to claim 1, which comprises:
- ascertaining a physical decay time constant for present surroundings in which a sound level of a sound signal on which the audio signal is based has dropped to a predefined proportion of an initial value; and
- selecting the second decay parameter in such a way that the second decay time of the second level measurement is provided by the physical decay time constant for the present surroundings.

8. The method according to claim 1, which comprises using the difference between the first level measurement and the second level measurement to detect at least one of a presence of a contribution by diffuse reverberation in the audio signal or a decaying contribution by the sound event in the second level measurement.

9. The method according to claim 8, which comprises:

comparing the difference between the first level measurement and the second level measurement with a stipulated first limit value; and if an absolute value of the difference between the two level measurements exceeds an absolute value of the first limit value, detecting a presence of a contribution by diffuse reverberation in the audio signal, or of a decaying contribution by the sound event in the second level measurement.

10. The method according to claim 8, which comprises, if the absolute value of the difference between the first level measurement and the second level measurement exceeds the absolute value of the first limit value, ascertaining the difference between the absolute value of the difference and the absolute value of the limit value as the decaying contribution by the sound event in the second level measurement.

11. The method according to claim 8, which comprises applying a minimum tracker to the difference between the first level measurement and the second level measurement, and using the minimum tracker to detect one or more of the following: a presence of the contribution, or the contribution, by diffuse reverberation in the audio signal, or a presence of the decaying contribution, or the decaying contribution, by the sound event in the second level measurement.

12. The method according to claim 11, which comprises:

using the decaying contribution by the sound event to produce a time-dependent correction function; and producing the reverberation interference level on a basis of a subtraction of the correction function from the second level measurement.

13. The method according to claim 10, which comprises:

using the decaying contribution by the sound event to produce a time-dependent correction function; and producing the reverberation interference level on a basis of a subtraction of the correction function from the second level measurement.

14. The method according to claim 1, which comprises ascertaining the gain parameter on a basis of a spectral subtraction, and thereby using a quotient of the reverberation interference level and the first level measurement.

15. The method according to claim 1, which comprises:

breaking down the audio signal into a plurality of frequency bands;

performing each of the first level measurement and the second level measurement on a frequency band by frequency band basis;

ascertaining a respective gain parameter for a plurality of frequency bands and applying to a signal component of the audio signal in the respective frequency band in order to eliminate the acoustic reverberation.

16. A method for eliminating acoustic reverberation in an audio signal of a hearing instrument, the method comprising:

acquiring a sound signal from the surroundings with an input transducer of the hearing instrument and forming an audio signal from the sound signal; and eliminating acoustic reverberation in the audio signal by carrying out the method according to claim 1.

17. A hearing instrument, comprising an input transducer for generating an audio signal and a signal processing unit connected to said input transducer and configured to perform the method according to claim 1.

* * * * *